(No Model.)  3 Sheets—Sheet 1.

C. A. TOWER.
VEHICLE MOTOR.

No. 535,605. Patented Mar. 12, 1895.

WITNESSES

INVENTOR
Clinton A. Tower
by his attorneys
W. Bakewell & Sons

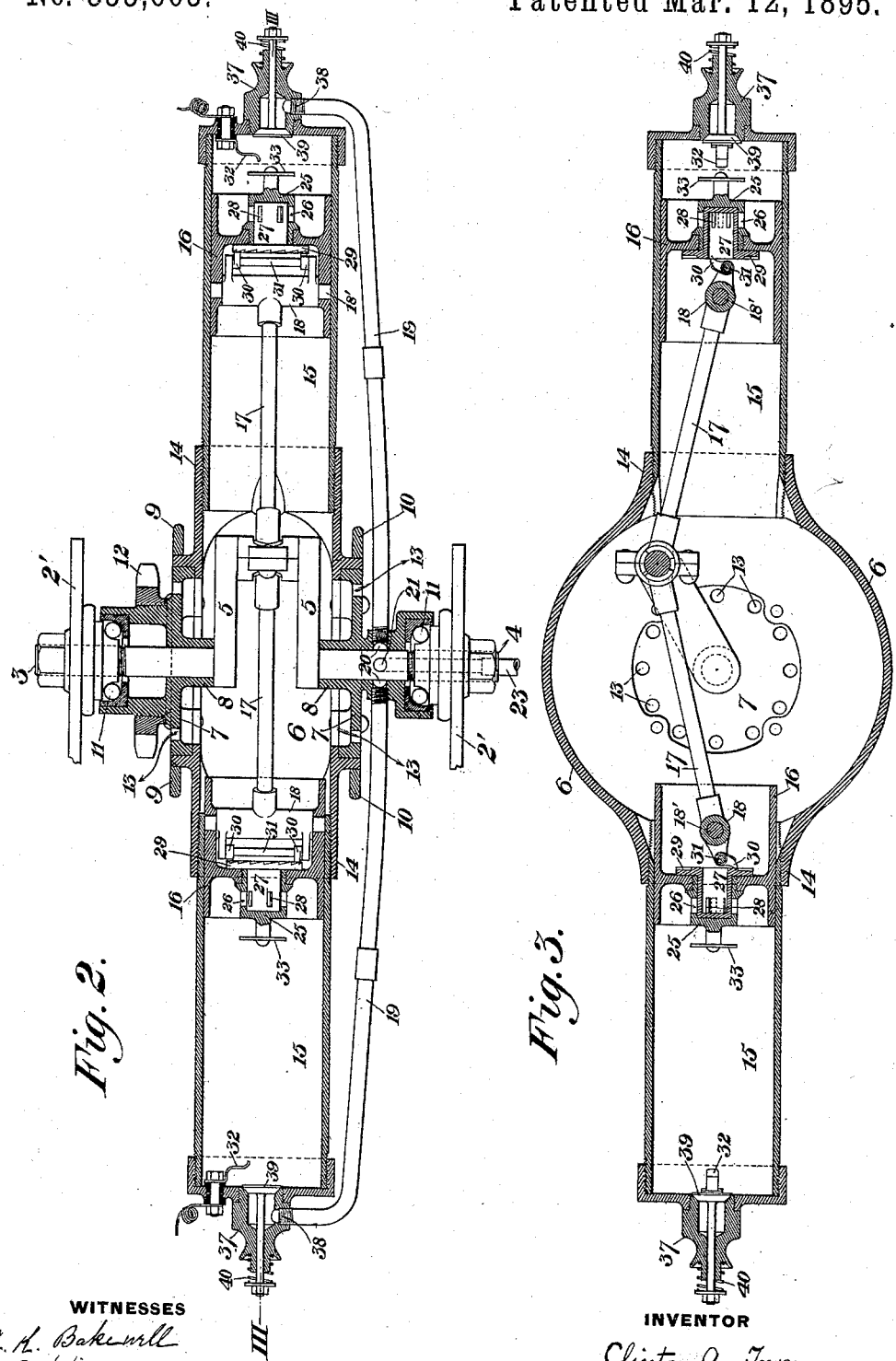

(No Model.)  C. A. TOWER.  3 Sheets—Sheet 3.
VEHICLE MOTOR.

No. 535,605.  Patented Mar. 12, 1895.

UNITED STATES PATENT OFFICE.

CLINTON A. TOWER, OF CLEVELAND, OHIO.

VEHICLE-MOTOR.

SPECIFICATION forming part of Letters Patent No. 535,605, dated March 12, 1895.

Application filed October 20, 1894. Serial No. 526,478. (No model.)

*To all whom it may concern:*

Be it known that I, CLINTON A. TOWER, of Cleveland, in the county of Cuyahoga and State of Ohio, have invented a new and useful Improvement in Vehicle-Motors, of which the following is a full, clear, and exact description, reference being had to the accompanying drawings, forming part of this specification, in which—

Figure 1:
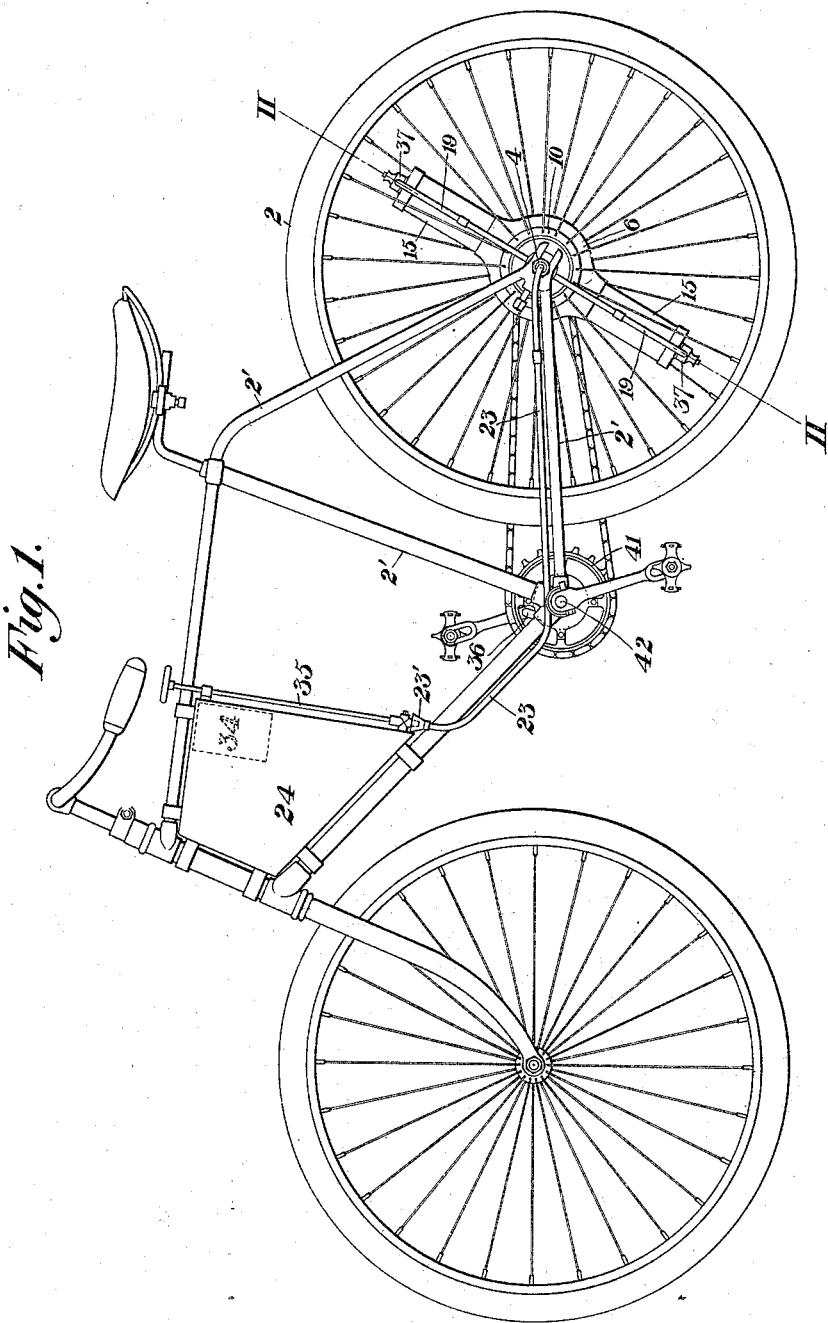
Figure 4:
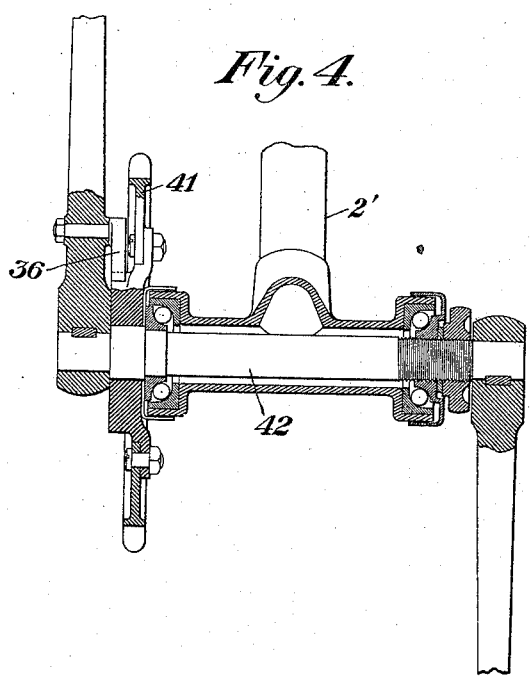

Figure 1 is a side elevation of a bicycle provided with my improved apparatus. Figs. 2 and 3 are views on a larger scale, Fig. 2 being a longitudinal section on the line II—II of Fig. 1, and Fig. 3 being a section on the line III—III of Fig. 2. Fig. 4 is a detail view showing the clutch connection between the pedal-shaft and the sprocket-wheel.

The object of my invention is to provide a motor for driving bicycles and other wheeled vehicles, and its purpose is to simplify the construction and to afford cheap, economical and efficient apparatus.

I have shown my invention as applied to driving of a bicycle of ordinary construction, but I wish it to be understood that the invention is not limited thereto, and that with mechanical modifications it may be applied to the driving of vehicles of other types.

In the drawings, 2 represents the driven wheel of a bicycle. The crank-shaft which is fixed to the bicycle frame 2' has two journal portions 3, 4, at opposite ends of the hub of the wheel and in line with each other, and an intermediate crank 5. The hub of the wheel comprises a hollow casing 6 fixed by means of disks 7, or otherwise, to sleeves 8 which surround and are journaled upon the shaft 3, 4. Said hub is contained between the spokes of the wheel, which are fixed to disks 9, 10, at opposite sides of the hub. The sleeves 8, 8, may be provided with ball bearings 11, so as to reduce the friction of their revolution around the crank-shaft 3, 4.

12 is the usual chain sprocket wheel which is fixed to one of the sleeves 8, and is connected by a chain to the usual pedal shaft. The hub-casing 6 when thus applied to the wheel contains within itself the crank 5, and is closed, except that it is provided with lateral exhaust holes 13 hereinafter described; and at its periphery it is formed with sockets 14 for the reception of motor cylinders 15, 15.

Where, as shown in the drawings, two of these motor cylinders are used, they are preferably placed at diametrically opposite points on the hub casing. Each of the cylinders is provided with a reciprocating piston 16 and with a connecting rod 17. At their inner ends these connecting rods are journaled to the crank-pin 5, and at their outer ends they are pivotally connected to the piston, preferably by means of the barrel 18 on the connecting rod which loosely encircles a pin 18' in the piston. When thus constructed it will be clear that if the pistons of the cylinders be caused to reciprocate by a suitable motive agent, as hereinafter described, the action of the pistons against the stationary crank 5 and the reaction against the cylinder-heads and the hub-casing 6, will cause the wheel to revolve around the axis 3, 4, and will drive the bicycle or other vehicle to which the wheel is applied.

The motive agent which I prefer to use for actuating the cylinders is explosive gas, though the broader claim of my invention is not limited thereto, since other motive fluid actuated by explosive agents, may be employed. As shown in the drawings, however, each of the cylinders has at its outer end or head a gas inlet device comprising a valve-casing 37 having a gas-inlet port 38 and a puppet-valve 39, which is normally held against its seat by a spring 40, or by other means, such as the centrifugal action of the revolution of the wheel itself.

The gas is supplied to the inlet ports 38 by pipes 19, which extend to the hub of the wheel and are secured or otherwise fixed to one of the sleeves 8, communicating therethrough with an annular recess or chamber 20 formed on the interior of the sleeve. Said annular chamber is in communication with a port 21 which leads from a tubular passage in the stationary shaft 4, and said passage at the end of the shaft is connected by a suitable pipe 23 to an air-mixing funnel 23' into which a regulated supply of volatile explosive fluid, such as naphtha, drops from a reservoir 24 fixed to a suitable place on the frame of the bicycle. The reservoir may be charged with compressed gas and connected directly with the pipe 23. The piston of each cylinder is provided with a suitable exhaust device, preferably constructed as follows: 25 is a tubular chamber or casing which is fixed to the inner side of the piston and has lateral ports 26. Within this chamber is a rotary valve 27, having lateral ports 28, adapted to register with the ports 26 at certain periods of rotation of the valve. On the end of the piston next to the wheel-hub the valve 27 is formed with a flange or disk-portion the face of which is formed with a circular series of notches or teeth engaged by pawls 30 projecting radially from a pin 31 which is fixed to the sleeve 18. As the piston reciprocates within the cylinder and drives the wheel above described, its motion oscillates the sleeve 18 and as the pawls 30 oscillate with said sleeve, their engagement with the teeth or notches 29 causes the flanged valve to turn the distance of one notch for each stroke of the piston.

The parts just described are so proportioned relatively to each other that the valve shall be turned so as to bring the ports 26 and 28 into register once at each fourth stroke of the piston, that is, once at each second revolution of the wheels to which the cylinder is fixed.

For the purpose of igniting the explosive charge within the cylinder, I may employ any suitable igniting device, but I prefer to use an electrical igniter having two terminals 32, and 33, the terminal 32 being a spring which projects inwardly from the head of the cylinder, and the terminal 33 being a projection extending from the piston, so that at the end of each out-stroke of the piston (the stroke away from the hub of the wheel) the terminals shall be brought into contact, and that they shall be separated at the beginning of the in-stroke, thereby producing a spark at which the gas is ignited. The battery 34 or other suitable electrical generator to which the terminals are connected is carried on the machine at any suitable point.

35 is a valve-rod which is connected to a valve in the pipe which leads from the reservoir 24 and which enables the rider of the bicycle to open or close connection of the reservoir with the cylinders at will and thus to cut off or to regulate the supply of explosive fluid to the cylinders.

In the use of a bicycle driven by a motor, it is desirable that the rider should be able when he is using the motor to have the pedals remain stationary, and for this purpose I connect the hub of the sprocket wheel 41 on the pedal shaft 42 with the pedal-shaft itself by means of a clutch device 36, so constructed that when the pedal shaft is turned in a forward direction it shall operatively engage the hub and shall rotate it, but that the hub may turn forward without rotating the shaft. This clutch, if desired, may be placed on the rear sprocket wheel. When provided with this device, the rider may put his feet on the pedals, and thus hold them stationary while the motor drives the sprocket wheel freely and without interference by or with the pedals.

The operation of the apparatus as thus described is as follows:—To start the motors in operation, the rider opens the valve 35, puts the battery or electrical generator into circuit, and starting the wheel in motion mounts it. The first instroke of the piston in each cylinder draws through the valve 39 a supply of mixed gas and air into the cylinder The return stroke of the piston then compresses the charge within the cylinder, the inlet valve being seated by the compression and by the action of its spring, and the terminals 32 33 are brought into contact at the termination of said stroke. At the beginning of the next instroke the separation of said terminals produces a spark which ignites the charge and causes it to act by explosion propulsively upon the piston, pressing it inwardly. On the next return stroke of the piston, the exhaust valve is opened by means above described, and the exploded gases within the cylinder are expelled through the exhaust valve out of the inner open end of the cylinder into the hub-casing 6, and thence they escape through the exhaust opening into the air. The hub-casing 6 into which the gases discharge acts as a hood preventing the disagreeable noises attending the exhaust from gas engines. The two cylinders on the wheel are thus operated alternately with reference to each other, and at each explosion an impulse is given to the wheel which causes it to revolve and to propel the bicycle. A very rapid motion can thus be transmitted.

As the motor cylinders are carried around with the wheel and thus revolved at a considerable rate of speed through the air, they are cooled by the air currents and are thus prevented from being overheated without the necessity of making any provision for water circulation.

The entire apparatus being very simple, can be made of light weight so that it does not detract from the usefulness of the bicycle, and as the cylinders are contained between the two rows of spokes of the wheel, they are out of the way and afford no inconvenient projections.

The lubrication of the pistons of the cylinders 15 may be effected easily by providing them with suitable oil cups. Oil leaking from the pistons will be caught within the hub-casing 6, and when the wheel revolves will be thrown by centrifugal action out against the pistons, and will thus be saved from loss.

Within the scope of my invention as defined in the claims, very many changes and modifications of the parts may be made. Valves constructed differently from those which I have described may be employed, and other changes will suggest themselves to those skilled in the art, when the problem of adapting my invention to varying conditions is presented.

What I claim is—

1. A driven vehicle wheel having a hub provided with sleeve-portions and with a surrounding casing, a crank-shaft which passes through the sleeves, a cylinder or cylinders fixed to the casing and having pistons which extend within the same and are connected with the crank, disks surrounding the sleeves at opposite ends of the hub, and two sets of spokes connected respectively to said disks, and inclosing the cylinders between them; substantially as described.

2. A driven vehicle wheel having two sets of spokes, and a motor cylinder or cylinders placed between the sets of spokes and connected with a stationary pin or crank.

3. A driven vehicle-wheel having a hub provided with a surrounding casing, a cylinder or cylinders fixed to the casing and having pistons which extend within the same and are connected with a crank, and two sets of spokes situate respectively on opposite sides of the cylinder or cylinders and connected with the casing; substantially as described.

In testimony whereof I have hereunto set my hand.

CLINTON A. TOWER.

Witnesses:
THOMAS W. BAKEWELL,
H. M. CORWIN.